(12) United States Patent
Patterson

(10) Patent No.: US 7,467,167 B2
(45) Date of Patent: Dec. 16, 2008

(54) SYSTEM AND METHOD FOR COALESCING A PLURALITY OF SNAPSHOTS

(75) Inventor: Hugo Patterson, Mountain View, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 519 days.

(21) Appl. No.: 10/101,889

(22) Filed: Mar. 19, 2002

(65) Prior Publication Data

US 2003/0182326 A1 Sep. 25, 2003

(51) Int. Cl.
*G06F 17/30* (2006.01)
*G06F 15/16* (2006.01)

(52) U.S. Cl. ............... 707/204; 709/219

(58) Field of Classification Search ......... 707/102, 707/204, 162, 1; 711/161–162, 154; 709/219
See application file for complete search history.

(56) References Cited

U.S. PATENT DOCUMENTS

| 4,570,217 | A | 2/1986 | Allen et al. |
| 5,163,131 | A | 11/1992 | Row et al. |
| 5,202,979 | A | 4/1993 | Hillis et al. |
| 5,278,979 | A | 1/1994 | Foster et al. |
| 5,355,453 | A | 10/1994 | Row et al. |
| 5,485,579 | A | 1/1996 | Hitz et al. |
| 5,802,366 | A | 9/1998 | Row et al. |
| 5,819,292 | A | 10/1998 | Hitz et al. |
| 5,931,918 | A | 8/1999 | Row et al. |
| 5,941,972 | A | 8/1999 | Hoese et al. |
| 5,963,962 | A | 10/1999 | Hitz et al. |
| 6,065,037 | A | 5/2000 | Hitz et al. |
| 6,144,999 | A * | 11/2000 | Khalidi et al. ............... 709/219 |
| 6,289,356 | B1 | 9/2001 | Hitz et al. |
| 6,425,035 | B2 | 7/2002 | Hoese et al. |
| 6,460,055 | B1 * | 10/2002 | Midgley et al. ............. 707/204 |
| 6,625,625 | B1 * | 9/2003 | Kihara et al. ............... 707/204 |
| 6,829,617 | B2 * | 12/2004 | Sawdon et al. ............. 707/102 |
| 6,883,110 | B1 * | 4/2005 | Goddard ........................ 714/6 |
| 2003/0182301 | A1 | 9/2003 | Patterson et al. |
| 2004/0010487 | A1 * | 1/2004 | Prahlad et al. .................. 707/1 |
| 2005/0081187 | A1 * | 4/2005 | Odinak et al. ............... 717/101 |

OTHER PUBLICATIONS

Hitz, David, et al., TR3002 File System Design for a NPS File Server Appliance, 1-10, Network Appliance, Inc., Sunnyvale, CA, USA.

(Continued)

*Primary Examiner*—Meng-Ai An
*Assistant Examiner*—Camquy Truong
(74) *Attorney, Agent, or Firm*—Cesari and McKenna, LLP

(57) ABSTRACT

A system and method for coalescing a plurality of snapshots into a single destination volume file system. Each snapshot and its replicated file system is replicated in a directory associated with the destination file system in which the coalesced snapshots are stored. The destination file system can be associated with a backup server and information from each of the plurality of snapshots can be transferred to the backup server by an respective backup clients over a network. Information can be passed to the backup server from the backup client(s) using a dump and restore process.

20 Claims, 11 Drawing Sheets

OTHER PUBLICATIONS

Akyurek, Sedat, *Placing Replicated Data to Reduce Seek Delays*, Department of Computer Science, University of Maryland, UMIACS-TR-91-121, CS-TR-2746, Aug. 1991.

Bitton, Dina, *Disk Shadowing*, Proceedings of the 14th VLDB Conference, LA, CA 1988.

Chaudhuri, Surajit, et al., *Self-Tuning Technology in Microsoft SQL Server*, Data Engineering Journal 22, 2 1999 pp. 20-27.

Chutani, Sailesh, et al., *The Episode File System*, In Proceedings of the USENIX Winter 1992.

Coyne, Robert A., et al., *Storage Systems for National Information Assets*, Proc. Supercomputing 92, Minneapolis, Nov. 1992, pp. 626-633.

Finlayson, Ross S., et al., *Log Files: An Extended File Service Exploiting Write-Once Storage* Department of Computer Science, Stanford University, Report No. STAN-CS-87-1177, Sep. 1987.

Gray, Jim, et al., *The Recovery Manager of the System R Database Manager*, ACM Computing Surveys, (13)2:223-242 1981.

Hecht, Matthew S., et al. *Shadowed Management of Free Disk Pages with a Linked List*, ACM Transactions on Database Systems, 8/4, Dec. 1983, pp. 503-514.

Howard, John, H. et al., *Scale and Performance in a Distributed File System*, Carnegie Mellon University, CMU-ITC-87-068, Aug. 1987.

Howard, John H., *An Overview of the Andrew File System*, Carnegie Mellon University, CMU-ITC-88-062 1988.

Howard, John, H. et al., *Scale and Performance in a Distributed File System*, ACM Trans. Computer System, 6(1), Feb. 1988 pp. 51-81.

Kazar, Michael Leon, *Synchronization and Caching Issues in the Andrew File System*, Carnegie Mellon Univeristy, CMU-ITC-88-063.

Kazar, Michael L., et al., *DEcorum File System Architectural Overview*, USENIX Summer Conference, Anaheim, California, 1990.

Kemper, Alfons, et al., *Performance Tuning for SAP R/3*, Data Engineering Journal 22, 2 1999 pp. 33-40.

Kent, Jack et al., *Optimizing Shadow Recovery Algorithms*, IEEE Transactions on Software Engineering, 14(2): 155-168 , Feb. 1988.

Kistler, et al., *Disconnected Operation in the Coda File System*, ACM Transactions on Computer Systems, vol. 10, No. 1, Feb. 1992, pp. 3-25.

Lorie, Raymond, A. *Physical Integrity in a Large Segmented Database*, ACM Trans. Database Syst., vol. 2, Mar. 1977, pp. 91-104.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 Sep. 1988.

Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.

Quinlan, Sean, *A Cached WORM File System*, Software-Practice and Experience, 21(12):1289-1299 1991.

Rosenblum, Mendel, et al., *The LFS Storage Manager*, Computer Science Division, Electrical Engineering And Computer Sciences, Univ. of CA, presented at Summer '90 USENIX Technical Conference, Anaheim, CA Jun. 1990.

Rosenblum, Mendel, et al. *The Design and Implementation of a Log-Structured File System* Jul. 24, 1991 pp. 1-15.

Rosenblum, Mendel, *The Design and Implementation of a Log-Structured File System*, 1992 pp. 1-93.

Rosenblum, Mendel, et al., *The Design and Implementation of a Log-Structured File System*, In Proceedings of ACM Transactions on Computer Systems, (10)1:26-52, Feb. 1992.

Schiefer, Berni, et al., *DB2 Universal Database Performance Tuning*, Data Engineering Journal 22, 2 1999 pp. 12-19.

Seltzer, Margo I., et al., *Journaling Versus Soft Updates: Asynchronous Meta-Data Protection in File Systems*, Proceedings of 200 USENIX Annual Technical Conference, Jun. 18-23, 2000.

Shasha, Dennis, *Tuning Time Series Queries in Finance: Case Studies and Recommendations*, Data Engineering Journal 22, 2 1999 pp. 41-47.

Sidebotham, Bob, *Volumes: The Andrew File System Data Structuring Primitive*, EEUG Conference Proceedings, Manchester, UK, Autumn 1986.

Subramanian, Muralidhar, et al., *Performance Challenges in Object-Relational DBMSs*, Data Engineering Journal 22, 2 1999 pp. 28-32.

Weikum, Gerhard, et al., *Towards Self-Tuning Memory Management for Data Servers*, Data Engineering Journal 22, 2 1999 pp. 3-11.

West, Michael, et al. *The ITC Distributed File System: Prototype and Experience*, Carnegie-Mellon University, Technical Report CMU-ITC-040, Mar. 1985.

Zayas, Edward R, AFS-3 Programmer's Reference: Architectural Overview, Transarc Corporation, Pittsburgh, PA, 1.0 edition 1991.

McKusick et al. "A Fast File System for UNIX", published by Computer Systems Research Group, Computer Science Division, Department of Electrical Engineering and Computer Science, University of California at Berkeley, last revision Feb. 18, 2984, 14 pages.

McKusick et al. "Soft Updates: A Technique for Eliminating Most Synchronous Writes in the Fast Filesystem", published at Proceedings of the FREENIX Track: 1999 USENIX Annual Technical Conference, Monterey, California, Jun. 6-11, 1999, 18 pages.

Van Gelderen, Jeroen C., Little UFS2 FAQ (Apr. 25, 2003, v15.a), , published by The Free BSD Documentation Project, last revision Apr. 25, 2003, retrieved from sixshooter.v6.thrupoint.net/jeroen/faq.html#UFS-DIFF-FFS, 4 pages.

McKusick, Marshall Kirk, "Running 'fsck' in the Background", published in Proceedings of the BSDCon '02 Conference on File and Storage Technologies, Feb. 11-14, 2002, 15 pages.

Batschulat et al. "The UFS File System", chapter of the Solaris Internals, Solaris 10 and OpenSolaris Kernal Architecture, Second Edition, Last Revision Jun. 15, 2006, 55 pages.

* cited by examiner

SYSTEM AND METHOD FOR COALESCING A PLURALITY OF SNAPSHOTS

RELATED APPLICATION

This application is related to the following U.S. patent application: Ser. No. 10/101,901 entitled SYSTEM AND METHOD FOR MANAGING A PLURALITY OF SNAPSHOTS by Hugo Patterson et al., which is incorporated herein by reference.

FIELD OF THE INVENTION

The present invention relates to data backup and restoral and, more particularly to providing data backup and restoral services to a plurality of computers.

BACKGROUND OF THE INVENTION

A file server is a computer that provides file service relating to the organization of information on storage devices, such as disks. The file server or filer includes a storage operating system that implements a file system to logically organize the information as a hierarchical structure of directories and files on the disks. Each "on-disk" file may be implemented as a set of disk blocks configured to store information, such as text, whereas the directory may be implemented as a specially-formatted file in which information about other files and directories are stored. A filer may be configured to operate according to a client/server model of information delivery to thereby allow many clients to access files stored on a server, e.g., the filer. In this model, the client may comprise an application, such as a file system protocol, executing on a computer that "connects" to the filer over a computer network, such as a point-to-point link, shared local area network (LAN), wide area network (WAN), or virtual private network (VPN) implemented over a public network such as the Internet. Each client may request the services of the filer by issuing file system protocol messages (in the form of packets) to the filer over the network.

A common type of file system is a "write in-place" file system, an example of which is the conventional Berkeley fast file system. In a write in-place file system, the locations of the data structures, such as inodes and data blocks, on disk are typically fixed. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not over-write data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the Write Anywhere File Layout (WAFL™) file system available from Network Appliance, Inc. of Sunnyvale, Calif. The WAFL file system is implemented within a microkernel as part of the overall protocol stack of the filer and associated disk storage. This microkernel is supplied as part of Network Appliance's Data ONTAP™ storage operating system, residing on the filer, that processes file-service requests from network-attached clients.

As used herein, the term "storage operating system" generally refers to the computer-executable code operable on a computer that manages data access and may, in the case of a filer, implement file system semantics, such as the Data ONTAP™ storage operating system implemented as a microkernel, and available from Network Appliance, Inc. of Sunnyvale, Calif., which implements a Write Anywhere File Layout (WAFL™) file system. The storage operating system can also be implemented as an application program operating over a general-purpose operating system, such as UNIX® or Windows NT®, or as a general-purpose operating system with configurable functionality, which is configured for storage applications as described herein.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. In the example of a WAFL file system, a RAID 4 implementation is advantageously employed. This implementation specifically entails the striping of data across a group of disks, and separate parity caching within a selected disk of the RAID group. As described herein, a volume typically comprises at least one data disk and one associated parity disk (or possibly data/parity) partitions in a single disk) arranged according to a RAID 4, or equivalent high-reliability, implementation.

Data protection for data stored on file servers is often accomplished by backing up the contents of volumes or file systems to tape devices. In certain known file server configurations, a full backup of the entire file system or volumes is initially created. This full backup stores all of the data contained in the selected volume or file system. At set intervals thereafter, incremental backups are generated. These incremental backups record the changes or "deltas," between the full backup or last incremental backup in the current state of the data. These backups, both full and incremental, are typically written to a tape drive. A noted disadvantage of writing backups to tape devices is the relatively slow speed at which they commit backup data to storage. Overall server performance may be substantially degraded during the backup operations due to the large processing overhead involved with a tape backup operation. This processing overhead derives from copying operations involving the large amount of data being moved from the disks comprising the file system or volume to the backup tape device. When restoring a file system from a tape backup, many incremental backups are utilized to fully restore the file system. Each of the deltas, or incremental backups, must be individually stored, in the proper order, to generate a restored active file system. Thus, to fully restore a file system from a set of tape backups, the full backup must first be restored. Then each of the incremental backups are restored in the proper order to the file system. Only after each of these incremental backups has been restored in turn, will the active file system be completely restored.

Certain known examples of file systems are capable of generating a snapshot of the file system or a portion thereof. Snapshots and the snapshotting procedure are further described in U.S. Pat. No. 5,819,292 entitled METHOD FOR MAINTAINING CONSISTENT STATES OF A FILE SYSTEM AND FOR CREATING USER-ACCESSIBLE READ-ONLY COPIES OF A FILE SYSTEM by David Hitz et al, issued Oct. 6, 1998, which is hereby incorporated by reference as though fully set forth herein. "Snapshot" is a trademark of Network Appliance, Inc. It is used for purposes of this patent to designate a persistent consistency point (CP) image. A persistent consistency point image (PCPI) is a point-in-time representation of the storage system, and more particularly, of the active file system, stored on a storage device (e.g., on disk) or in other persistent memory and having a name or other unique identifier that distinguishes it from other PCPIs taken at other points in time. A PCPI can also include other information (metadata) about the active file system at the particular point in time for which the image is taken. The terms "PCPI" and "snapshot" shall be used interchangeably through out this patent without derogation of Network Appliance's trademark rights.

Snapshots can be utilized as a form of backup protection for an active file system. To provide for improved data retrieval and restoration, snapshots should be copied to another file system different than the volume or file system being snapshotted. In one known example, a backup server is utilized. Such a backup server stores snapshots and manages a collection of snapshots according to a user defined set of options. Backup servers are described in further detail in related U.S. patent application Ser. No. 10/101,901 entitled SYSTEM AND METHOD FOR MANAGING A PLURALITY OF SNAPSHOTS by Hugo Patterson et-al., which is hereby incorporated by reference.

In one known example, a backup server requires a separate volume for each file system that the backup server is managing snapshots. Thus, for a backup server to manage a set of snapshots for a plurality of different clients, the backup server would require a separate volume for each client. A system administrator for the backup server may find a multiplicity of such volume on a file server unwieldy to manage.

SUMMARY OF THE INVENTION

This invention overcomes the disadvantages of the prior art by providing a system and method for coalescing a plurality of snapshots from discrete, individual systems into a single backup (destination) file system volume, thus making management of the coalesced snapshots more convenient. A backup server storing snapshots associated with a plurality of discrete, individual file systems, each associated with a particular backup client, replicates the file systems in a single volume. Each of the replicated file systems is stored in a separate directory under the root file system of the backup server. The backup server cooperates with the various backup clients to ensure that only stable copies of backup client file systems are replicated.

Each of the backup clients manages a set of snapshots associated with its file system. Once each individual backup client has performed an update to the backup server, in accordance with the user-defined schedule which can be specific for each backup client, the backup server takes a snapshot of the volume containing the coalesced and replicated file systems. Thus, the various file systems of the backup clients have been coalesced or merged into a single volume on the backup server. The snapshot of this coalesced volume includes the file systems of each of the backup clients. By coalescing the various file systems into a single file system, multiple volumes are not required for a backup server to server a plurality of various backup clients.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Network Environment

Figure 1:
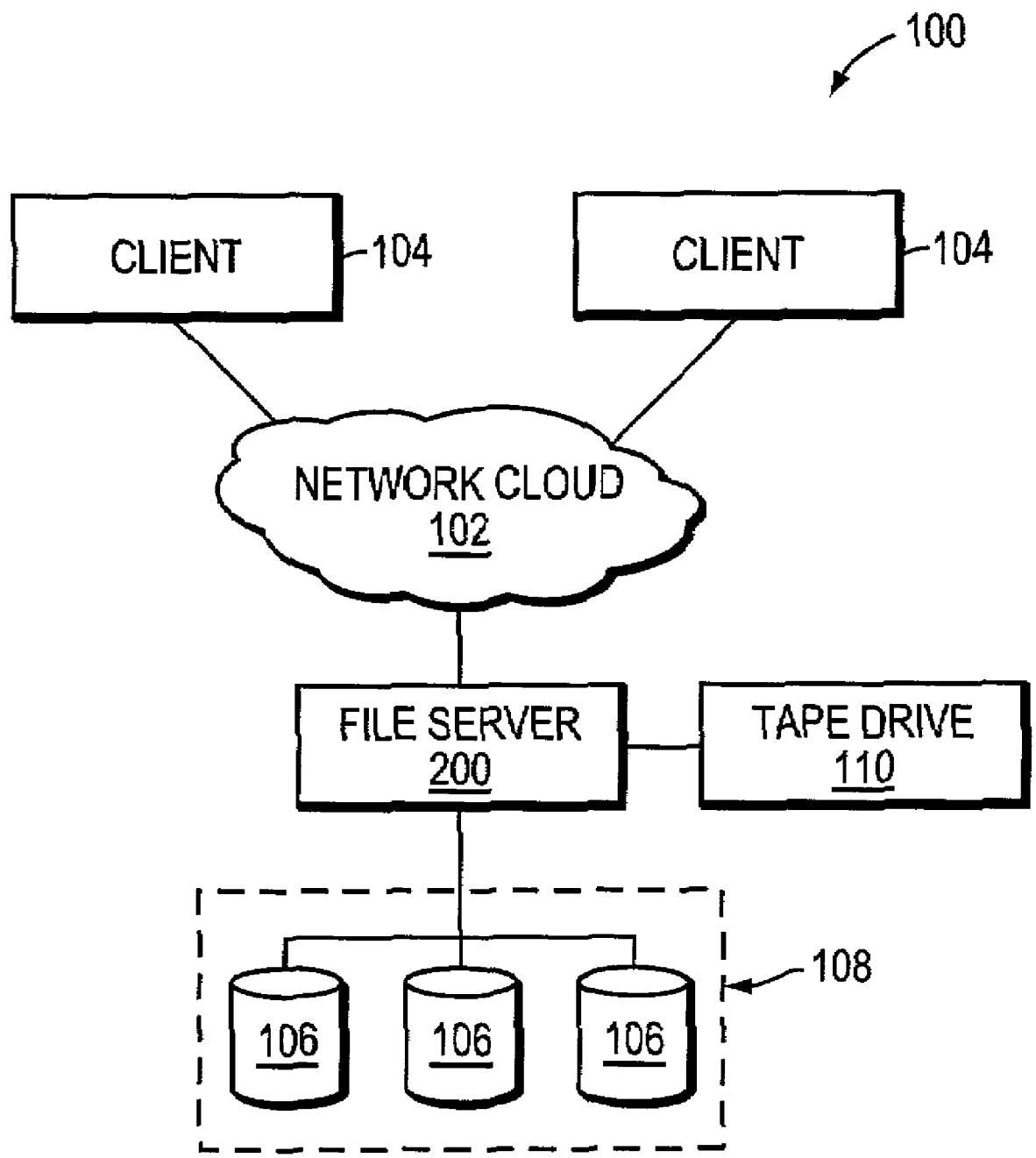
FIG. 1 is a schematic block diagram of an exemplary networking environment in accordance with an embodiment of the invention.

FIG. 1 is a schematic block diagram of an exemplary network environment 100 in which the principles of the present invention are implemented. A network 100 is based around a network cloud 102. This network cloud can be a local or network (LAN), a wide area network (WAN), virtual private network (VPN) utilizing communication links over the internet, for example, or a combination of LAN, WAN and VPN implementations can be established. For the purposes of this description, the term network cloud should taken broadly to include any acceptable network architecture. The network cloud 102 interconnects various clients 104. Also attached to the network cloud is a file server 200. This file server, described further below is configured to control storage of, and access to, data and a set 108 of interconnected storage volumes 106. Connected to the file server is a tape drive 110. In known data backup examples, the file server 200 would backup data stored on disks 106 to the tape drive 110. Each of the devices attached to the network cloud include an appropriate conventional network interface arrangement (not shown) for communicating over the network cloud using desired communication protocols such as the well-known Transport Control Protocol/Internet Protocol (TCP/IP), User Datagram Protocol (UDP), Hyper Text Transport Protocol (HTTP), Simple Network Management Protocol (SNMP), or Virtual Interface Connections (VI).

B. File Servers

Figure 2:
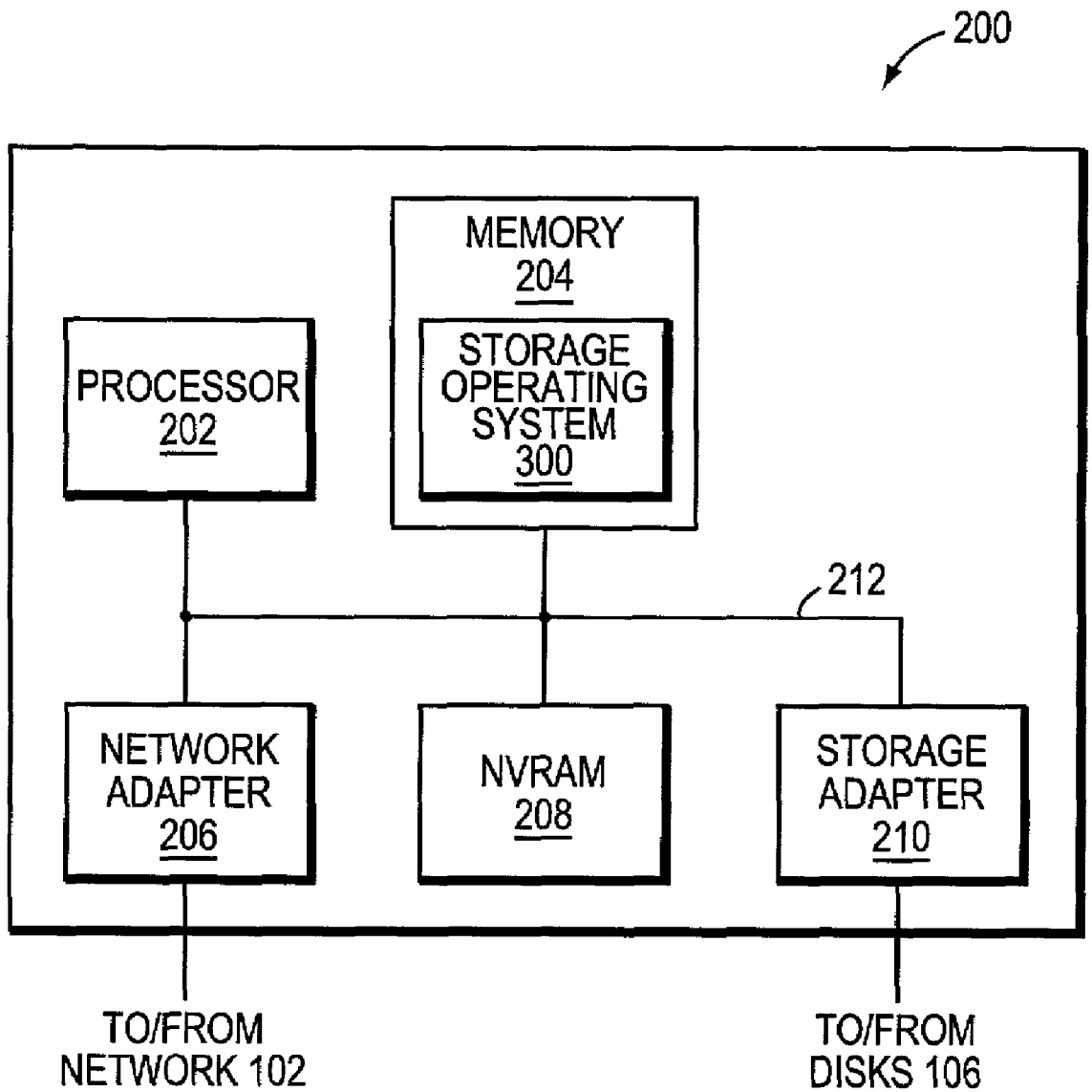
FIG. 2 is a schematic block diagram of an exemplary file server for use with an embodiment the invention.

FIG. 2 is a more-detailed schematic block diagram of an exemplary file server 200. By way of background, a file server or filer, is a computer that provides file service relating to the organization of information on storage devices, such as disks. However, it will be understood by those skilled in the art that the inventive concepts described here may apply to any type of file server, wherever implemented as a special-purpose or general-purpose computer, including a stand alone computer.

The file server 200 comprises a processor 202, in memory 204, in network adapter 206, a nonvolatile random access memory (NVRAM) 208 in the storage adapter 210 interconnected by system bus 212. Contained within the memory 204 is a storage operating system 300 that implements a file system to logically organize the information as a hierarchical structure of directories and files on the disks. In the illustrative embodiment, the memory 204 comprises storage locations that are addressable by the processor and adapters for storing software program code. The operating system 300, portions of which are typically resident in memory and executed by the processing elements, functionally organizes the filer by inter alia, invoking storage operations in support of a file service implemented by the file server.

The network adapter 206 comprises a mechanical, electrical and signaling circuitry needed to connect the file server 200 to client 104 over network cloud 102. The client 104 maybe a general-purpose computer configured to execute applications, such as data base applications. Moreover, the client 104 may interact with the filer server 200 in accordance with the client/server model of information delivery. That is, the client may request the services of the file server, and the file server may return the results of the services requested by the client, by exchanging packets defined by an appropriate networking protocol.

The storage adapter 210 incorporates with the storage operating system 300 executing on the file server to access information requested by the client. Information maybe stored on the disks 106 of a disk 108 (FIG. 1) that is attached via the storage adapter 210 to the file server. The storage adapter 210 includes input/output (I/O) interface circuitry that couples to the disks over in I/O interconnect arrangement, such as a conventional high-performance Fibre Channel serial link topology. The information is retrieved by the storage adapter and, if necessary, processed by the processor 202 (or the adapter 210 itself) prior to be forwarded over the system bus 212 to the network adapter 206, where information is formatted into appropriate packets and returned to the client 104.

In one exemplary file server implementation, the file server can include a non-volatile random access memory (NVRAM) 208 that provides fault-tolerant backup of data, enabling the integrity of filer server transactions to survive a service interruption based upon a power failure, or other catastrophe.

C. Storage Operating System

To facilitate the generalized access to the disks 106 on the array 108, the storage operating system 300 implements write-anywhere file system that logically organizes the information as a hierarchical structure of directories and files on the disks. Each "on-disk" file may be implemented as a set of disks blocks configured to distort information, such as data, where as the directory may be implemented as a specially formatted file which other files and directories are stored. As noted above, in the illustrative embodiment described herein, the operating system is the NetApp® Data ONTAP™ operating system available from Network Appliance, Inc., that implements the write-anywhere file layout (WAFL™) file system. It is expressly contemplated that any appropriate file system can be used, and as such, where the term WAFL or file system is employed, it should be taken broadly to refer to any file system that is otherwise adaptable to the teachings of this invention.

The storage operating system comprises a series of software layers, including a media access layer 302 of network drivers (e.g., an Ethernet driver). The storage operating system 300 further includes network protocol layers, such as an Internet Protocol (IP) layer 304 and its supporting transport mechanisms, the Transport Control Protocol (TCP) layer 306 and the User Datagram Protocol (UDP) layer 308.

A file system protocol layer provides multi-protocol data access and, to that end, includes support for the Network File System (NFS) protocol 312, the Common Internet File System (CIFS) protocol 314 and the Hyper Text Transfer Protocol (HTTP) 316. In addition, the storage operating system 300 includes a disk storage layer 322 that implements a disk storage protocol, such as a RAID protocol, and a disk driver layer 324 that implements a disk access protocol such as, e.g., a Small Computer System Interface (SCSI) protocol.

Bridging the disk software layers with the network and file system protocol layers is a file system layer 326 of the storage operating system 300. Generally the file system layer 326 implements a file system having an on-disk format representation that is block-based using, e.g., 4-kilobyte (KB) data blocks and using inodes to describe the files. In response to transaction requests, the file system generates operations to load (retrieve) the requested data from disks 106 if it is not resident "in-core", i.e., in the filer's memory 204. If the information is not in memory, the file system layer 326 indexes into the inode file using the inode number to access an appropriate entry and retrieve a logical volume block number. The file system layer 326 then passes the logical volume block number to the disk storage (RAID) layer 322, which maps that logical number to a disk block number and sends the latter to an appropriate driver (for example, an encapsulation of SCSI implemented on a fibre channel disk interconnection) of the disk driver layer 324. The disk driver accesses the disk block number from disks 106 and loads the requested data in memory 204 for processing by the filer 200. Upon completion of the request, the filer (and storage operating system) returns a reply, e.g., a conventional acknowledgement packet defined by the CIFS specification, to the client 104 via the network cloud 102.

It should be noted that the storage access request data path 330 through storage operating system layers described above needed to perform data storage access for the client requests received the file server may alternately be implemented in hardware, software or a combination of hardware and software. That is, in an alternate embodiment of this invention, the storage access request data path 330 may be implemented as logic circuitry embodied within a field programmable gate array (FPGA) or in an application specific integrated circuit (ASIC). This type of hardware implementation increases the performance of the file service provided by the file server 200 in response to a file system request issued by a client.

Included within the file system layer is a snapshot process 328, which implements the inherent snapshot capabilities of the file system. The native Snapshot™ capabilities of the illustrative WAFL file system are further described in *TR3002 File System Design for an NFS File Server Appliance* by David Hitz et al., published by Network Appliance, Inc., which is hereby incorporated by reference.

Figure 4:
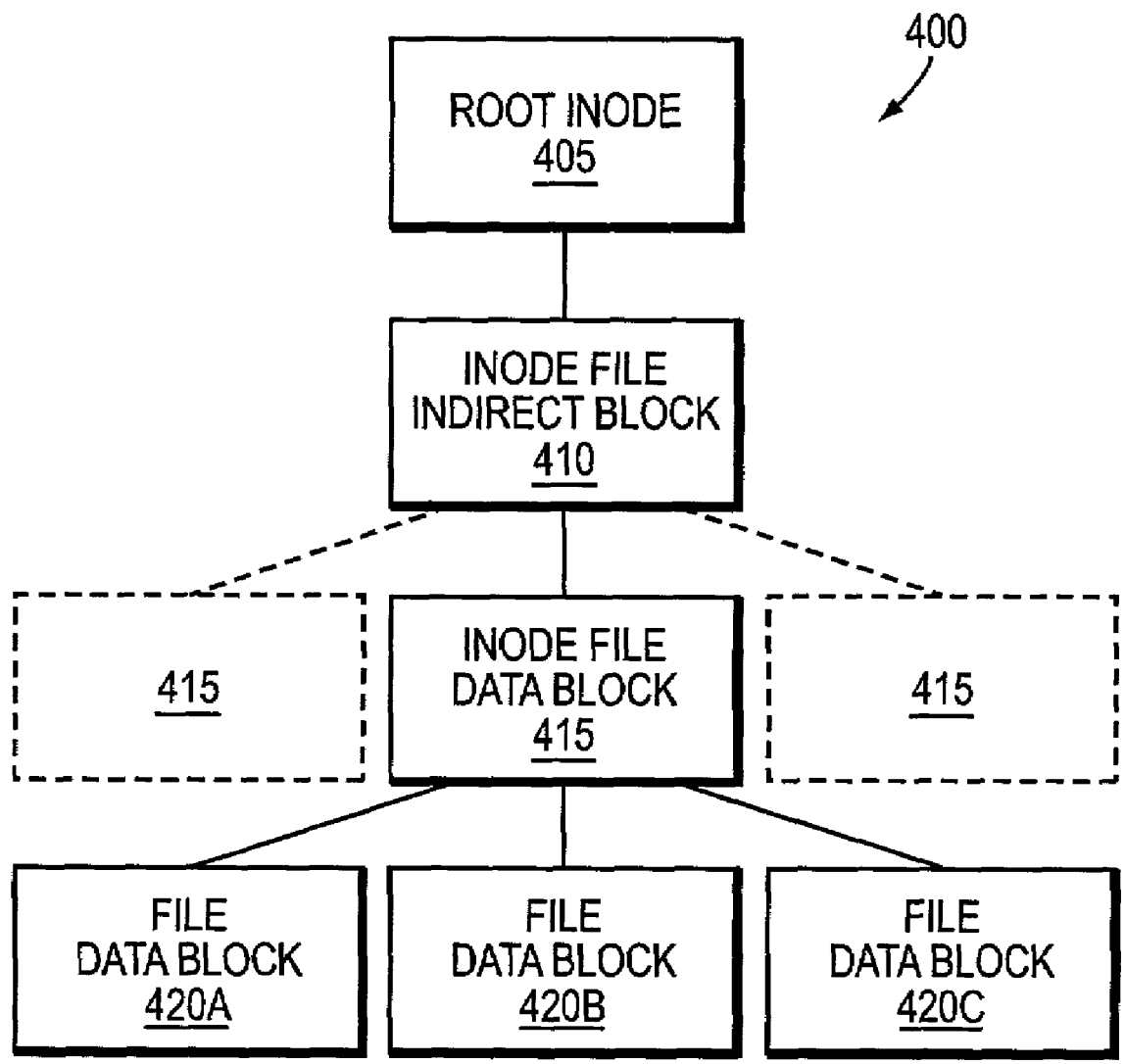
FIG. 4 is an exemplary block diagram of a file system inode structure.

By way of background, a snapshot is a restorable version of a file system created at a predetermined point in time. Snapshots are generally created on some regular schedule. The snapshot is stored on-disk along with the active file system, and is called into the buffer cache of the filer memory as requested by the storage operating system. An exemplary file system inode structure 400 is shown in FIG. 4. The root inode 405 contains information describing the inode file associated with a given file system. In this exemplary file system inode structure root inode 405 contains a pointer to the inode file indirect block 410. The inode file indirect block 410 contains a set of pointers to inode file and data blocks 415. The inode file data block 415 includes pointers to file and data blocks to 420A, 420B and 420C. Each of the file data blocks 420(A-C) is capable of storing, in the illustrative embodiment, 4 kilobytes (KB) of data.

Figure 5:
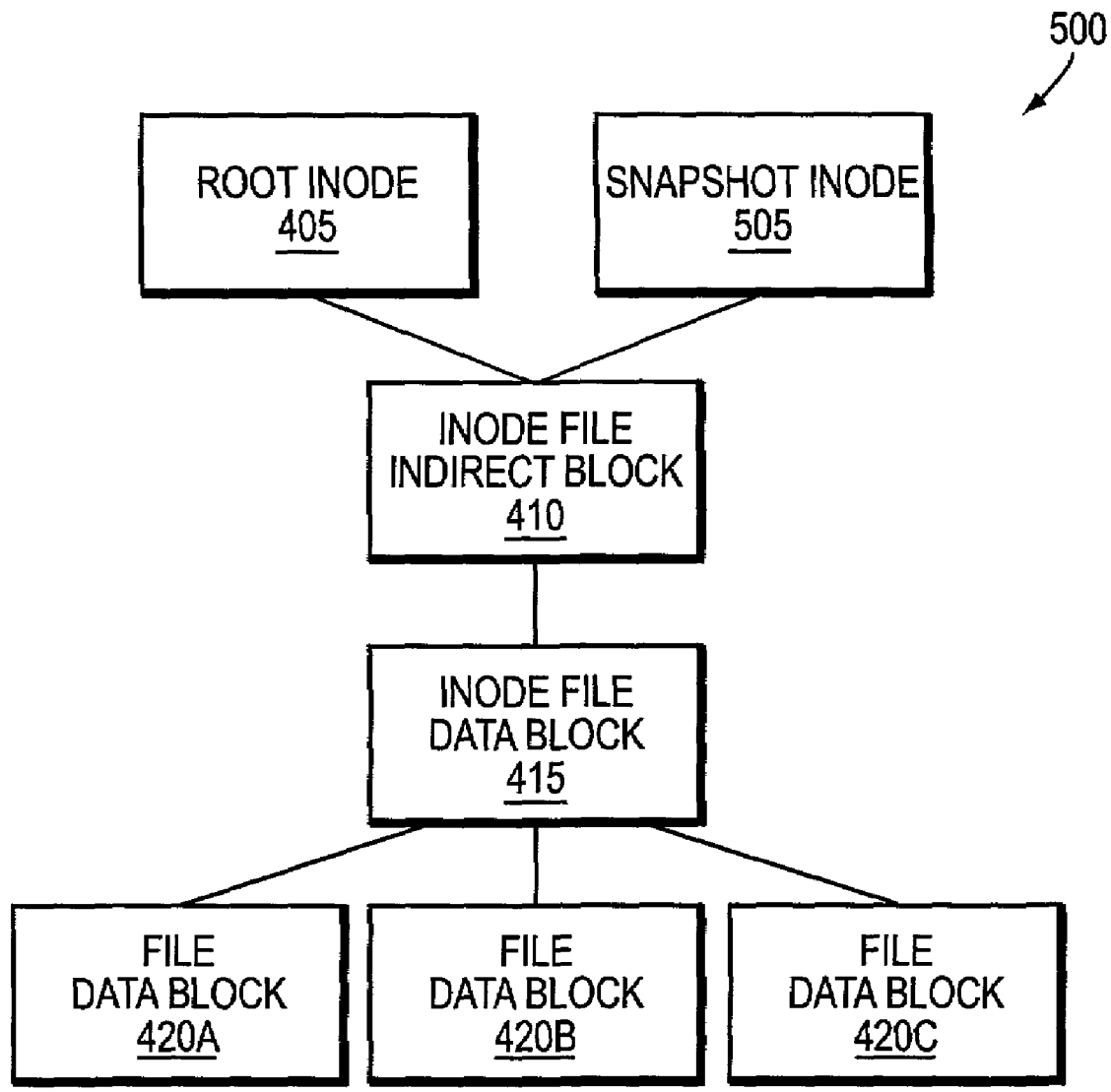
FIG. 5 is a block diagram of a file system inode structure after being snapshotted.

When the file system generates a snapshot of a given file system, a snapshot inode is generated as shown in FIG. 5. The snapshot inode 505 is, in essence, a duplicate copy of the root inode 405 of the file system 400. Thus, the exemplary file system structure 500 includes the same inode file indirect block 410, inode file data block(s) 415 and file data blocks 420A-C as in FIG. 4. When a user modifies a file data block, the file system layer writes the new data block to disk and changes the active file system to point to the newly created block.

Figure 6:
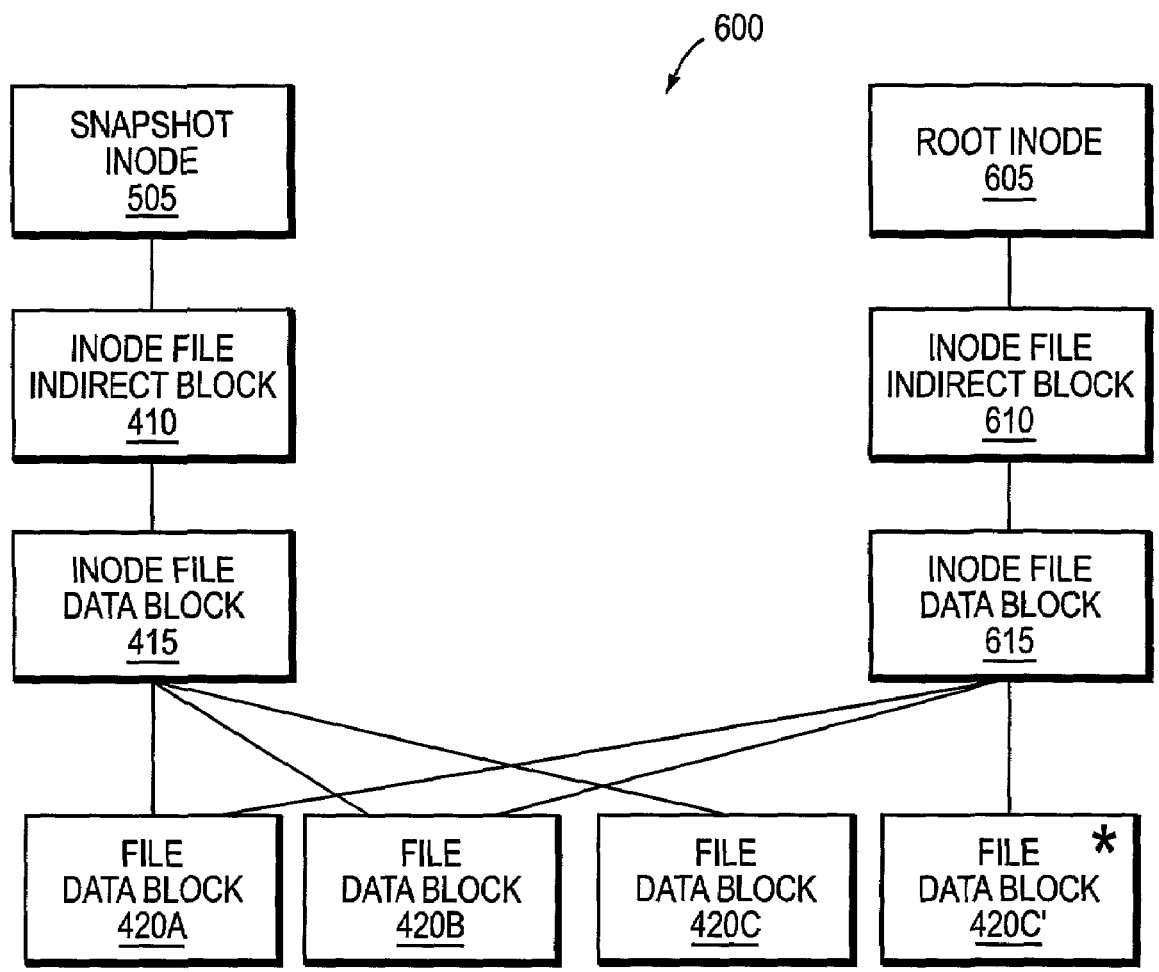
FIG. 6 is an exemplary block diagram of a file system inode structure after a file data block has been updated.

FIG. 6 shows an exemplary inode file system structure 600 after a file data block has been modified. In this illustrative example, file data block 420C was modified to file data block 420C'. When file data block 420C is modified file data block 420C', the contents of the modified file data block are written to a new location on disk as a function of the exemplary WAFL file system. Because of this new location, the inode file data block 615 pointing to the revised file data block 420C⁻ must be modified to reflect the new location of the file data block 420C. Similarly, the inode file indirect block 610 must be rewritten to point to the newly revised inode file and data block. Thus, after a file data block has been modified the snapshot inode 505 contains a point to the original inode file system indirect block 410 which in turn contains a link to the inode file data block 415. This inode file data block 415 contains pointers to the original file data blocks 420A, 420B and 420C. However, the newly written inode file data block 615 includes pointers to unmodified file data blocks 420A and 420B. The inode file data block 615 also contains a pointer to the modified file data block 420C' representing the new arrangement of the active file system. A new file system root inode 605 is established representing the new structure 600. Note that metadata (not shown) stored in any snapshotted blocks (e.g., 505, 410, and 420C) protects these blocks from being recycled or over-written until they are released from all snapshots. Thus, while the active file system root inode 605 points to new blocks 610, 615 and 420C', the old blocks 505, 410, 415 and 420C are retained until the snapshot is fully released.

After a snapshot has been created and file data blocks modified, the file system layer can reconstruct or "restore" the file system inode structure as it existed at the time of the snapshot by accessing the snapshot inode. By following the pointers contained in the snapshot inode 505 through the inode file indirect block 410 and inode file data block 415 to the unmodified file data blocks 420A-C, the file system layer can reconstruct the file system as it existed at the time of creation of the snapshot.

D. Coalescing Snapshots

Figure 7:
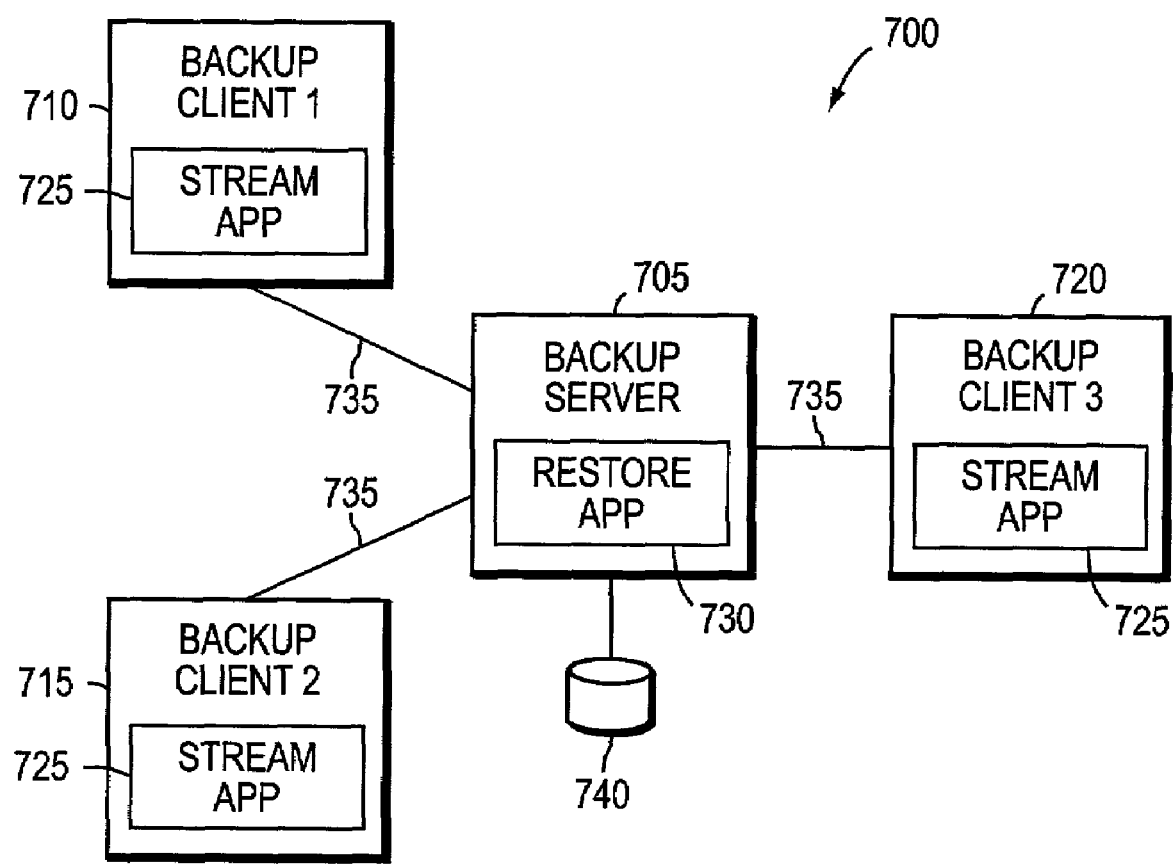
FIG. 7 is an exemplary block diagram of a backup server environment.

FIG. 7 is a schematic block diagram of an exemplary file system environment 700 in the principles of the present invention can be practiced. A backup server 705 is operatively interconnected to three backup clients 710, 715, 720. These backup clients utilize the backup server for storage and maintenance of their backup data storage. Backup clients can be any sort of computer, including, for example, file servers. Using known techniques, the backup server could provide backup support for the plurality of backup clients by either utilizing a separate volume for each of the backup clients being backed up or by storing a full set of snapshots for each of the backup clients. Such techniques are described in the above-incorporated patent application entitled SYSTEM AND METHOD FOR MANAGING A PLURALITY OF SNAPSHOTS.

Figure 3:
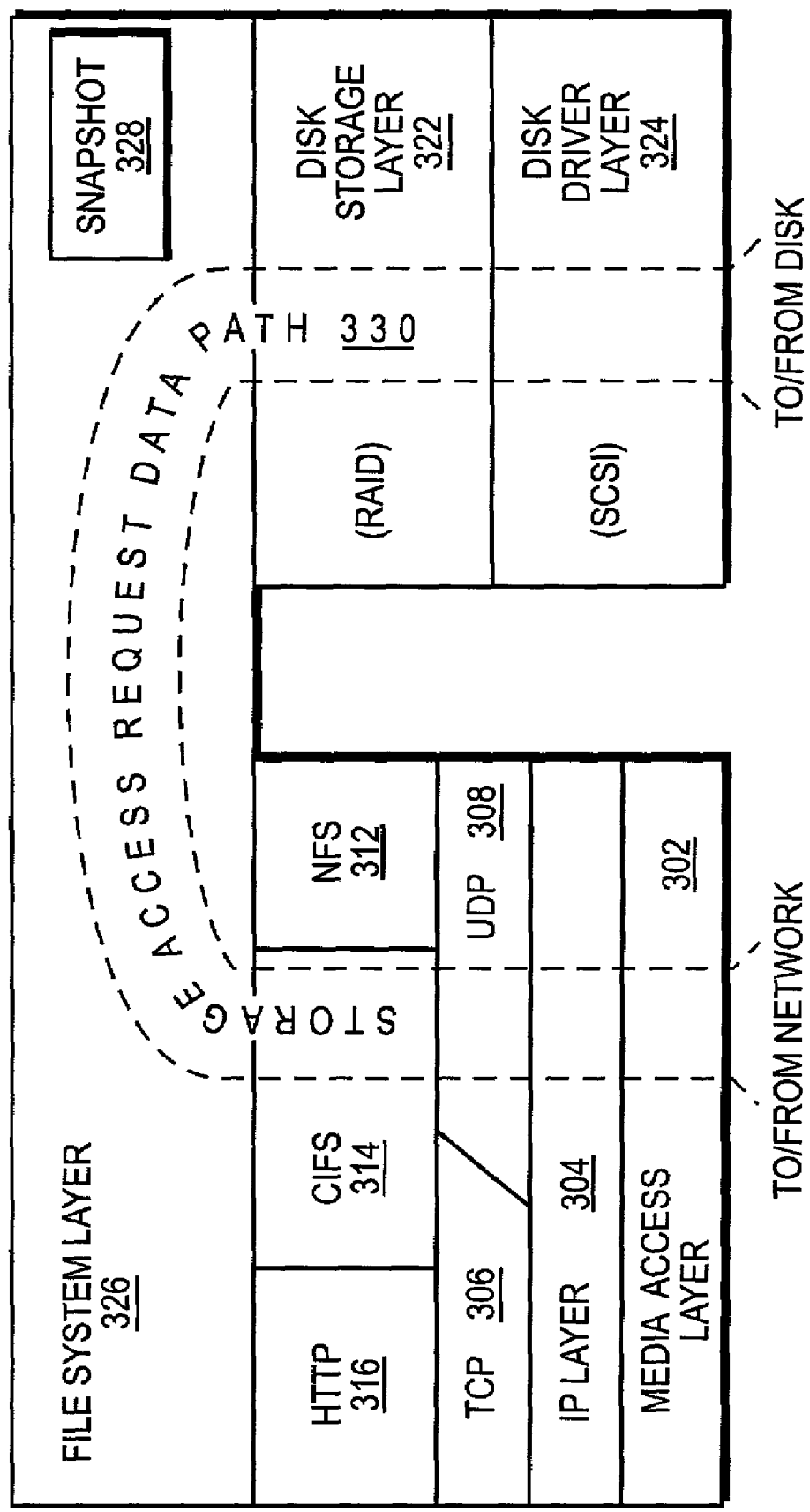
FIG. 3 is a schematic block diagram of an exemplary storage operating system providing support for snapshots.

Note that the backup server 705 can be implemented in accordance with the arrangement set forth in FIG. 2 and executing a storage operating system described with reference to FIG. 3. However, any acceptable architecture and operating system can be used. Likewise, any or all of the backup clients 710, 715, 720 can be implemented in accordance with the above description.

Each backup client includes a backup/recover (stream) application 725, which, in the illustrative embodiment, creates a restore stream of the backup client's file system. A restore stream comprises a series of write operations directed at the backup server's file system. The stream can be encapsulated in a variety of network protocols including TCP/IP. This restore stream is then transferred to the backup server 705 over network connections 735. The network connections 735 can be any acceptable network connection including, for example, a local area network (LAN), a wide area network (WAN) or other acceptable networking architecture. The backup server, executing a restore application 730, which utilizes the restore stream, generates a copy of the backup client's file system on a volume 740 associated with the backup server. This replication results in a complete copy of the backup client's file system on a volume associated with backup server.

In accordance with the present invention, the backup server can "coalesce" or merge the snapshotted file systems associated with each of the backup clients to a single file system and volume. This coalescing of snapshots frees the backup server from having to have a separate volume for each backup client's file system.

Figure 8:
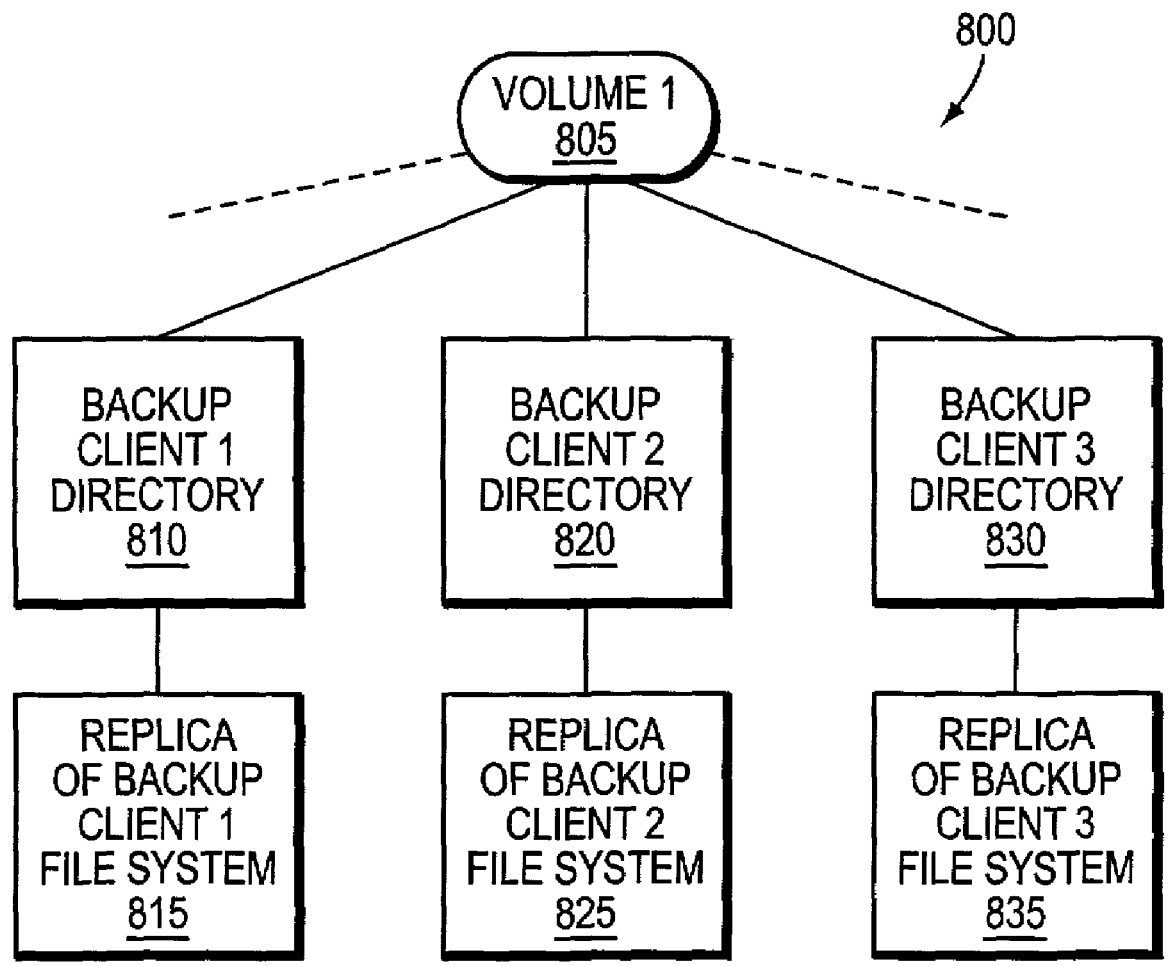
FIG. 8 is a block diagram of a volume's file system detailing the procedure for coalescing snapshots.

An exemplary file system 800 of a backup server coalescing a plurality of snapshots is shown in FIG. 8. In this illustrative embodiment, the storage volume associated with the backup server containing the stored file systems of the backup clients is named Volume 1 (805). Within the volume 805, there is a directory associated with each of the backup clients 810, 820, and 830. During backup operations, the backup server replicates, by performing the above-described backup/restore operation, each client's file system in the appropriate directory. Thus, each of these backup client directories becomes, in essence, the root, or top-level, directory of a file system associated with each of the backup clients. Within each of the backup client directories 810, 820 and 830 is the replica of the backup client file system. For example, in directory 810 is a replica of the file system associated with backup client 1 (815). Similarly, a replica of the file system associated with backup client 2 (825) is stored within the backup client 2 directory 820. Likewise, the backup client 3 directory 830 is associated with the replica 835. Thus, by generating a single snapshot of the backup server file system 800, the backup server has effectively snapshotted each of the backup client's file systems without requiring the reservation of a separate volume for each backup client.

Figure 9:
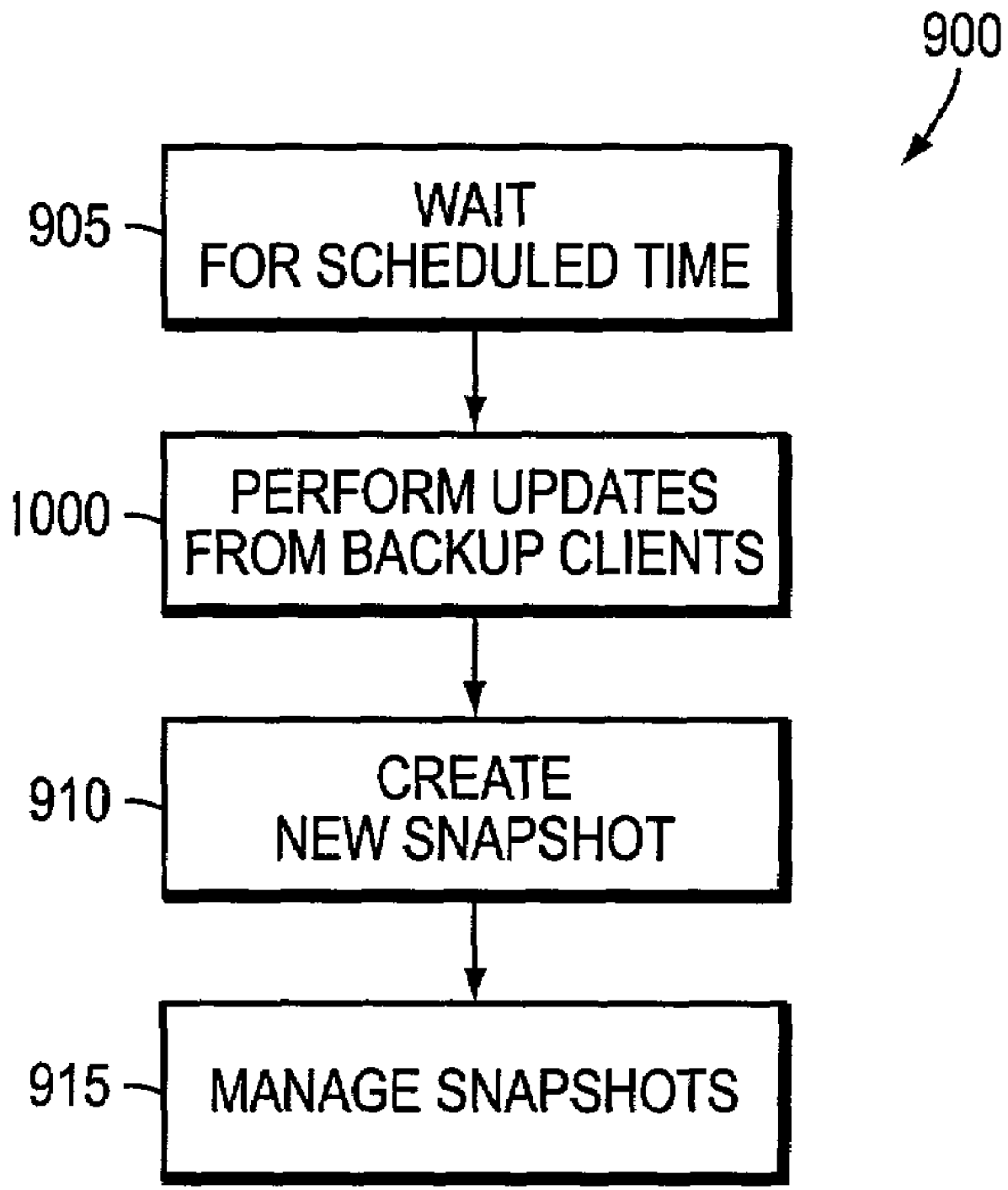
FIG. 9 is a flowchart of the procedure performed by the backup server when managing a plurality of coalesced snapshots.

FIG. 9 shows the steps involved in the procedure 900 performed by the backup server in updating and snapshotting the file systems or data sets associated with a plurality of backup clients. In step 905, the backup server waits for a specified and scheduled time. This scheduled time is established by the user or administrator of the backup server. Next, in step 1000, the backup server performs the updates from backup clients. This step, described further below, gathers the data contained on the various file systems of the backup clients and transfers it to the file system of the backup server. Next, in step 910, the backup server creates a new snapshot of its file system. This new snapshot, created by the backup server, contains (under a backup file system volume root directory) the root directories, associated subdirectories and files of each of the backup clients' file systems (see FIG. 8) coalesced into a single volume of the backup server. Finally, in step 915, the backup server "manages" the set of snapshots in accordance with a set of user-defined rules. For example, the user or administrator could configure the backup server to only store a set number of snapshots—five, for example. Thus, each time a new snapshot is created (step 910), the backup server would determine if more than five snapshots of the file system existed. If more than five snapshots had existed, in this example, the backup server would delete all but the most-recent five snapshots. It should be noted that a number of different rules and management techniques can be utilized in accordance with this invention. Management of a set of snapshots is described in further detail in the above-incorporated related patent application entitled SYSTEM AND METHOD FOR MANAGING A PLURALITY OF SNAPSHOTS.

Figure 10:
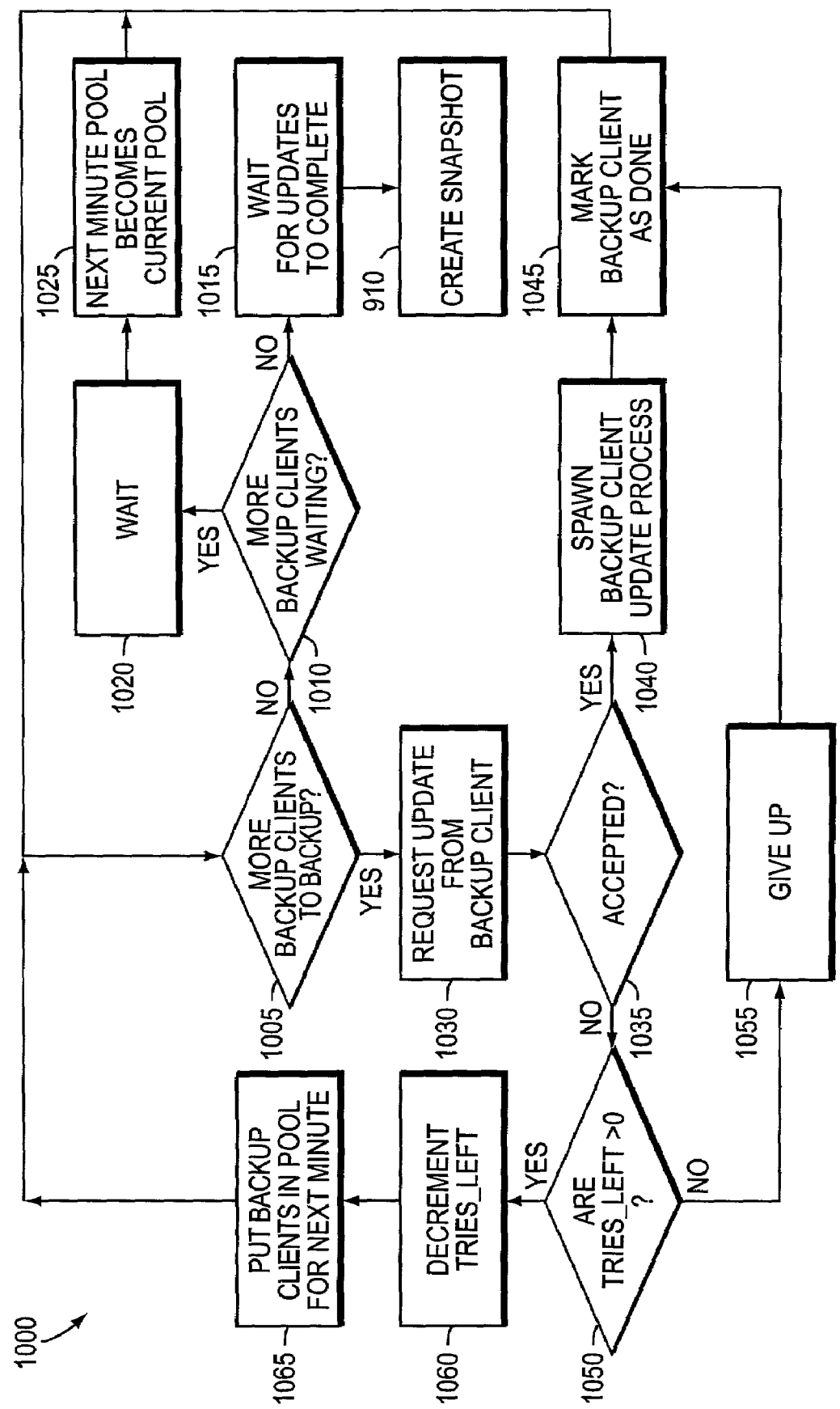
FIG. 10 is a flowchart of the procedure performed by the backup server in performing updates from clients.

The procedure 1000 performed by the backup server in performing the updates from backup clients is shown as a flow chart in FIG. 10. First, in step 1005, the backup server determines if there exist more backup clients requiring backup. If there are no more backup clients to backup, then the backup server determines whether there are more backup clients waiting (decision step 1010). If there are no backup clients waiting to have an update process created, the backup server waits for any updates that have begun to complete (step 1015). After these updates have been completed, the backup server creates the snapshot in step 910 (see FIG. 9). If there are more backup clients of the backup server waiting, the backup server branches from decision step 1010 to step 1020 where the backup server waits for one minute. Note that one minute is only exemplary, and the specific waiting time is highly variable. After waiting the requisite amount of time, the backup server moves the next minute pool to the current pool in step 1025. After moving the next minute pool to the current pool, the backup server loops back to step 1005.

If in step 1005, the backup server determines that there are more backup clients to backup, then the backup server, in step 1030, requests an update from a backup client. Next, in decision step 1035, the backup server determines whether the update request is accepted. If the update request is accepted, the backup server will spawn a backup client update process in step 1040. After the update process has been spawned by the backup server, the backup server will mark that particular backup client as done, in step 1045, before looping back to step 1005.

If the update request is not accepted, the backup server determines if the number of tries left is greater than zero. If the number of tries left is not greater than zero, then the backup server branches to step 1055, where it quits attempting to request an update from this backup client. Next, the backup server marks that particular backup client as done in step 1045 and continues with the process as described above. If, in step 1050, there are additional tries remaining, the backup server decrements the number of tries left in step 1060, and then, in step 1065, place this particular backup client in a pool for the next minute. After placing the backup client in a pool for the next minute, a backup server loops back to the step 1005.

Figure 11:
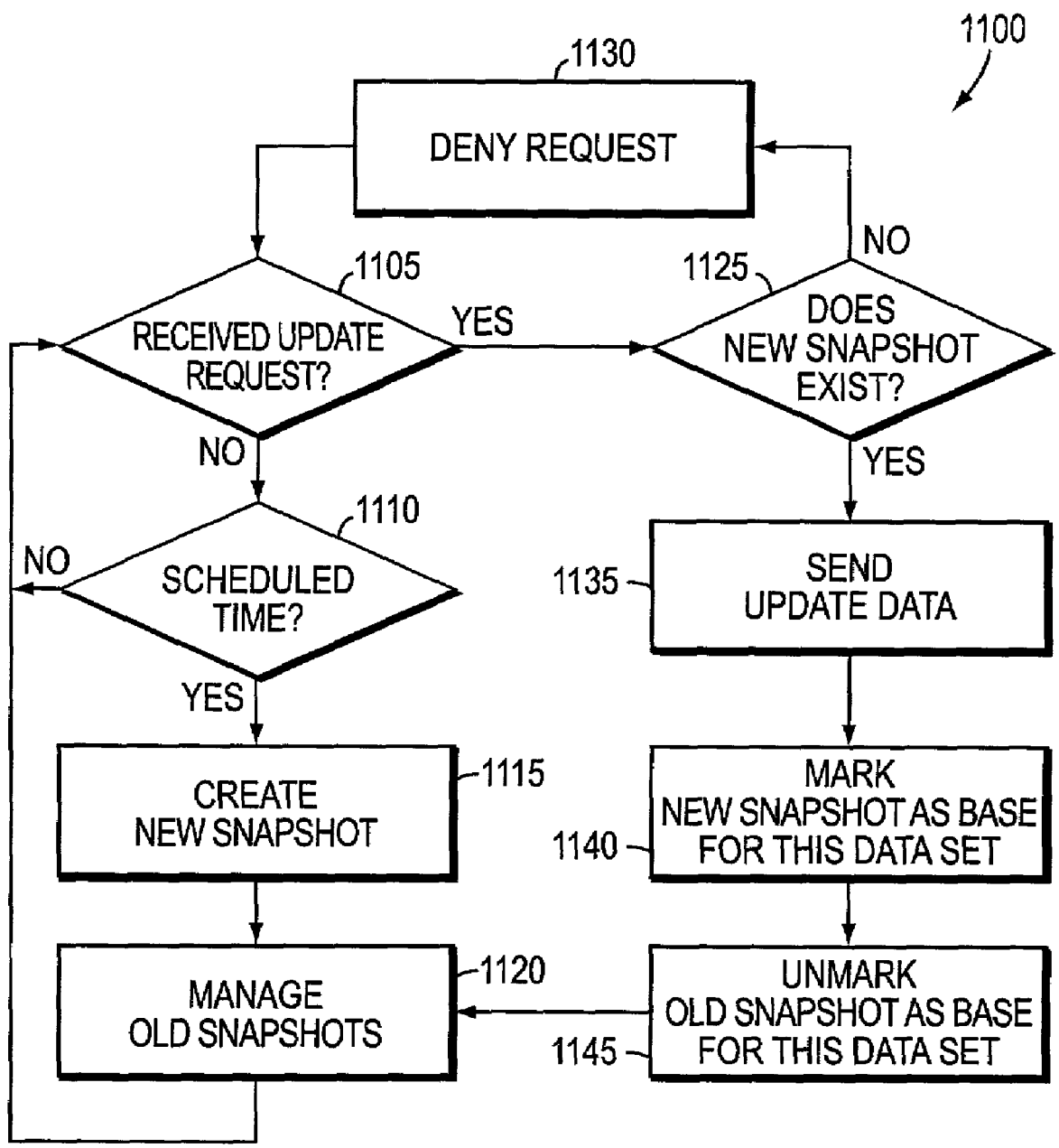
FIG. 11 is a flowchart of the procedure performed by the various clients of a backup server in accordance with an embodiment of this invention.

FIG. 11 is a flow chart detailing the steps of the procedure 1100 performed by a backup client in accordance with an embodiment of this invention. Such a procedure can be performed by, e.g., the backup/restore application (725 see FIG. 7) executing on the backup client. The backup client receives an update request in step 1105. Such an update request could be issued by the backup server. If the backup client has not received an update request, the backup client determines if it is the scheduled time for a creation of a new snapshot (step 1110). Such a scheduled time can be user-defined by the user or administrator of the particular backup client. If it is the scheduled for the creation of the new snapshot, the backup client creates a new snapshot in step 1115. In response to the creation of the new snapshot, the backup client manages the set of old snapshots in step 1120. The management of old snapshots can include a set of user-defined operations, for example, the deletion of any snapshots over a certain age. Once the management of the old snapshots has been completed, the backup client loops back to decision block 1105. Similarly if it was not the scheduled time in response to decision block 1110, the backup client loops to decision 1105.

If the backup client has received an update request, the backup client determines if a new snapshot exits in step 1125. If no new snapshot exists, the backup client denies the request in 1130 and continues onto decision block 1105. If a new snapshot does exist, the backup client sends the update data to the backup server in step 1135. The backup client then marks the new snapshot as a base snapshot for the particular data set that the backup client is backing up (step 1140). The backup client also unmarks the old snapshot as the base for the particular data set in step 1145. After unmarking the old snapshot as the base snapshot, the backup client then proceeds to manage the set of old snapshots in accordance with step 1120.

To again summarize, each of the plurality of backup clients of the backup server manages its own respective set of snapshots affiliated or associated with that backup client's file system. At a predetermined point in time, the backup server requests updates from each of its clients. During this update process, each of the backup clients sends any incremental changes to the file system of the backup server. The plurality of snapshots, generated by the various backup clients, are then coalesced into a single volume on the backup file server. Once each of the various file systems have been updated into the backup server volume, the backup server then takes a snapshot of its local file system containing the coalesced file systems. The backup server's collection of snapshots of the coalesced file system can be managed in accordance with a set of user-defined procedures.

The foregoing has been a detailed description of illustrative embodiments of the invention. Various modifications and additions can be made without departing from the spirit and scope of the invention. It is expressly contemplated that any of the functions, procedures or processes described herein can be implemented using hardware, firmware or software, consisting of a computer-readable medium including program instructions executing on a computer, or a combination of hardware, firmware and/or software. Accordingly, this description is meant to be taken only by way of example and not to otherwise limit the scope of the invention.

What is claimed is:

1. A method for coalescing a plurality of snapshots from a plurality of individual file systems to a destination file system, comprising:

creating a plurality of directories within the destination file system, each of the plurality of directories being associated with one of the plurality of snapshots of differing file systems, where each differing file system is associated with a separate client computer, the plurality of directories are stored in a single volume, each snapshot being a copy of a root inode of each client file system at a selected time, the root inode being a file describing an inode file associated with the each client file system;

replicating the plurality of snapshots of differing file system in the plurality of directories, each of the snapshots being replicated in a directory associated with the snapshot;

generating a snapshot of the entire destination file system, wherein each of the snapshots of differing file systems is included in the snapshot of the destination file system;

storing the snapshot of the entire destination file system on one or more storage devices; and managing the replicating of the plurality of snapshots of differing file systems according to a user-defined methodology, wherein the user-defined methodology includes updating the replicating of the plurality of snapshots of differing file system at a user-defined interval.

2. A backup server to store a plurality of backups from each of a plurality of individual computer systems, comprising:

a plurality of separate client computers each having a computer file system of the plurality of individual file systems;

a volume on the backup server;

a plurality of directories in the volume, each directory of the plurality of directories corresponding to a file system of the plurality of individual file systems;

means for storing in the volume a snapshot of each file system of the plurality of individual file systems, the snapshot being a copy of a root inode of the volume at a selected time, the root inode being a file describing an inode file associated with the each client file system;

means for creating a snapshot of the entire volume, the snapshot being a copy of a root inode of the volume at a selected time, the root inode being a file describing an inode file associated with the entire volume;

means for storing the snapshot of the entire volume to provide backup for the plurality of individual file systems; and managing the file system associated with each of the plurality of individual file systems according to a user-defined methodology, wherein the user-defined methodology includes updating file system associated with each of the plurality of individual file systems at a user-defined interval.

3. A computer method for backing up a plurality of file systems comprising:

sending a restore stream for each file system to a backup server, each restore stream including a copy of a corresponding file system of the plurality of file systems, where each file system of the plurality of file systems is associated with a separate backup client computer, the copy of a corresponding file system of the plurality of file systems including a snapshot, and each snapshot being a copy of a root inode of each client file system at a selected time, the root inode being a file describing an inode file associated with the each client file system;

in response to receiving each restore stream, storing the copy of the corresponding file system in a separate directory on the backup server;

creating a snapshot of the separate directories on the backup server to include the plurality of file systems in a single snapshot, the separate directories on the backup server being stored in a single volume; and managing the copy of the corresponding file system accord to a user-defined methodology, wherein the user-defined methodology includes updating the copy of the corresponding file system at a user-defined interval.

4. The method of claim 3, further comprising:

sending the restore stream for each file system by the backup client computer associated with the file system.

5. The method of claim 3, further comprising:

requesting an update of the copy of the corresponding file system, and in response to the backup client computer accepting an update request, transmitting the update to the backup server.

6. A system for backing up a plurality of file systems comprising:

a plurality of separate backup client computers, each backup client computer associated with one of the plurality of file systems, each backup client computer configured to send a restore stream, the restore stream including a copy of the file system associated with the backup client, the copy of a corresponding file system of the plurality of file systems including a snapshot, and each snapshot being a copy of a root inode of each client file system at a selected time, the root inode being a file describing an inode file associated with the each client file system;

a backup server configured to receive the restore streams, the backup server storing the copy of the file system associated with each restore stream in a separate directory on the backup server;

a snapshot of the entire backup server, the snapshot created from all of the separate directories on the backup server, the snapshot including the plurality of file systems associated with the plurality of separate backup client computers;

wherein the separate directories on the backup server are stored in a single volume; and wherein the copy of the file system associated with each backup client computer is managed according to a user-defined methodology, wherein the user-defined methodology includes updating the copy of the file system associated with the backup client computer at a user-defined interval.

7. The system of claim 6, further comprising:

an update request configured to initiate an update of the copy of the file system associated with the backup client computer, the update request sent by the backup server to the backup client computer.

8. A computer system for backing up a plurality of file systems comprising:

a plurality of client computers with each client computer having a file system and each client computer configured to send a restore stream for each file system to a backup server, each restore stream including a copy of a corresponding file system of the plurality of file systems, wherein the copy of a corresponding file system of the plurality of file systems includes a snapshot, and each snapshot being a copy of a root inode of each client file system at a selected time, the root inode being a file describing an inode file associated with the each client file system;

in response to receiving each restore stream, means for storing the copy of the corresponding file system in a separate directory on the backup server;

means for creating a snapshot of the separate directories on the backup server to include the plurality of file systems in a single snapshot;

wherein the separate directories on the backup server are stored in a single volume; and managing the copy of the corresponding file system according to a user-defined methodology, wherein the user-defined methodology includes updating the copy of the corresponding file system at a user-defined interval.

9. A computer readable medium containing executable program instructions for execution on a processor for backing up a plurality of file systems, the executable program instructions comprising program instructions for:

sending a restore stream for each file system to a backup server, each restore stream including a copy of a corresponding file system of the plurality of file systems, where each file system of the plurality of file systems is associated with a separate client computer, the copy of a corresponding file system of the plurality of file systems including a snapshot, and each snapshot being a copy of a root inode of each client file system at a selected time, the root node being a file describing an inode file associated with the each client file system;

in response to receiving each restore stream, storing the copy of the corresponding file system in a separate directory on the backup server;

creating a snapshot of the separate directories on the backup server to include the plurality of file systems in a single snapshot, the separate directories on the backup server being stored in a single volume; and managing the copy of the corresponding file system according to a user-defined methodology, wherein the user-defined methodology includes updating the copy of the corresponding file system at a user-defined interval.

10. A method for backing up a plurality of file systems comprising:

sending an update request to a plurality of backup client computers, wherein the update request requests changes between a previous snapshot of the file system associated with the backup client computer and a new snapshot of the file system associated with the backup client, and where each backup client computer is associated with a different file system of the plurality of file systems;

receiving at the backup server one or more updates, each update from one of the plurality of backup clients, each update including changes between the previous snapshot of the file system associated with the backup client computer and the new snapshot of the file system associated with the backup client computer, the previous snapshot and the new snapshot being a copy of a root inode of each client file system at a selected time, the root inode being a file describing an inode file associated with the each client file system at the selected time;

applying the changes in each update to a copy of a corresponding file system stored on the backup server, the backup server storing copies of each of the plurality of file systems;

creating a snapshot including the copies of the plurality of file systems stored on the backup server to coalesce the plurality of file systems into a single snapshot; and managing the copy of the corresponding file system according to a user-defined methodology, wherein the user-defined methodology includes updating the copy of the corresponding file system at a user-defined interval.

11. The method of claim 10 further comprising:

receiving, at the backup server, one or more denials from backup client computers, each denial indicating that a new snapshot of the file system associated with the backup client computer does not exist.

12. The method of claim 10 wherein each copy of a file system stored on the backup server is stored in a separate directory.

13. The method of claim 12 wherein all the separate directories are stored in a single volume.

14. A system for backing up a plurality of file systems comprising:

a plurality of separate backup client computers, each backup client computer associated with a different file system of the plurality of file systems, each backup client computer responsive to an update request and configured to send an update that includes changes between a previous snapshot of the file system associated with the backup client computer and a new snapshot of the file system associated with the backup client computer, the previous snapshot and the new snapshot being a copy of a root inode of each client file system at a selected time, the root inode being a file describing an inode file associated with the each client file system;

a backup server configured to receive updates, the backup server configured to apply the changes in each update to a copy of a corresponding file system stored on the backup server, the backup server storing copies of each of the plurality of file systems;

a snapshot of the backup server, the snapshot including the copies of the plurality of file systems stored on the backup server;

wherein all the separate directories are stored in a single volume; and managing the copy of the corresponding file system according to a user-defined methodology, wherein the user-defined methodology includes updating the copy of the corresponding file system at a user-defined interval.

15. The system of claim 14 further comprising: each backup client computer is further configured to send a denial indicating that a new snapshot of the file system associated with the backup client computer does not exist.

16. The system of claim 14 further comprising: each copy of a file system stored on the backup is stored in a separate directory.

17. A computer system having processor for backing up a plurality of file systems comprising:

means for sending an update request to a plurality of backup client computers, wherein the update request requests changes between a previous snapshot of the file system associated with the backup client computer and a new snapshot of the file system associated with the backup client, and where each backup client computer associated with a different file system of the plurality of file systems, the previous snapshot and the new snapshot being a copy of a root inode of each client file system at a selected time, the root inode being a file describing an node file associated with the each client file system;

means for receiving at the backup server one or more updates, each update from one of the plurality of backup client computers, each update including changes between the previous snapshot of the file system associated with the backup client computer and the new snapshot of the file system associated with the backup client computer;

means for applying the changes in each update to a copy of a corresponding file system stored on the backup server, the backup server storing copies of each of the plurality of file systems;

means for creating a snapshot including the copies of the plurality of file systems stored on the backup server to coalesce the plurality of file systems into a single snapshot; and means for managing the copy of the corresponding file system according to a user-defined methodology, wherein the user-defined methodology includes updating the copy of the corresponding file system at a user-defined interval.

18. A computer readable medium containing executable program instructions for backing up a plurality of file systems, the executable program instructions comprising instructions adapted for:

sending an update request to a plurality of backup client computers, wherein the update request requests changes between a previous snapshot of the file system associated with the backup client computer and a new snapshot of the file system associated with the backup client, and where each backup client computer associated with a different file system of the plurality of file systems, the previous snapshot and the new snapshot being a copy of a root inode of each client file system at a selected time, the root inode being a file describing an inode file associated with the each client file system;

receiving at the backup server one or more updates, each update from one of the plurality of backup client computers, each update including changes between the previous snapshot of the file system associated with the backup client computer and the new snapshot of the file system associated with the backup client computer;

applying the changes in each update to a copy of a corresponding file system stored on the backup server, the backup server storing copies of each of the plurality of file systems;

creating a snapshot including the copies of the plurality of file systems stored on the backup server to coalesce the plurality of file systems into a single snapshot; and managing the copy of the corresponding file system according to a user-defined methodology, wherein the user-defined methodology includes updating the copy of the corresponding file system at a user-defined interval.

19. A method, comprising:

organizing a backup server with a plurality of directories;

storing in a first directory of the plurality of directories a first snapshot, where the first snapshot is of a first client computer's file system;

storing in a second directory of the plurality of directories a second snapshot, where the second snapshot is of a second client computer's file system, the first and second snapshot of a client computer's file system being a copy of a root inode of each client file system at a selected time, the root inode being a file describing an inode file associated with the each client file system;

generating a single snapshot of the entire backup server, where the single snapshot is of the first snapshot of the first file system and is of the second snapshot of the second file system, wherein the first directory and the second directory are stored in a single volume; and managing the copy of the first snapshot of the first file system and the copy of the second snapshot of the second file system according to a user-defined methodology, wherein the user-defined methodology includes updating the first snapshot of the first file system and the second snapshot of the second file system at a user-defined interval.

20. The method of claim 19, further comprising:

storing in the first directory a plurality of first snapshots with respect to the first file system to store updates to the first file system;

storing in the second directory a plurality of second snapshots with respect to the second file system to store updates to the second file system;

generating a new single snapshot of the entire backup server, where the new single snapshot comprises a copy of the plurality of first snapshots and a copy of the plurality of second snapshots.

\* \* \* \* \*

UNITED STATES PATENT AND TRADEMARK OFFICE
CERTIFICATE OF CORRECTION

PATENT NO. : 7,467,167 B2  Page 1 of 1
APPLICATION NO. : 10/101889
DATED : December 16, 2008
INVENTOR(S) : Hugo Patterson It is certified that error appears in the above-identified patent and that said Letters Patent is hereby corrected as shown below:

Col. 12, line 12, should read:

managing the copy of the corresponding file system accord<u>ing</u>

Col. 14, line 63, should read:

<u>i</u>node file associated with the each client file system;

Signed and Sealed this

Twenty-third Day of March, 2010

David J. Kappos
*Director of the United States Patent and Trademark Office*